United States Patent
Starlinger-Huemer

(10) Patent No.: US 6,652,630 B1
(45) Date of Patent: Nov. 25, 2003

(54) DEVICE FOR DEGASSING MELTS

(75) Inventor: Franz Starlinger-Huemer, Vienna (AT)

(73) Assignee: Starlinger & Co. Gesellschaft m.b.H., Vienna (AU)

( * ) Notice: Subject to any disclaimer, the term of this patent is extended or adjusted under 35 U.S.C. 154(b) by 0 days.

(21) Appl. No.: 09/914,980
(22) PCT Filed: Mar. 2, 2000
(86) PCT No.: PCT/AT00/00055
§ 371 (c)(1), (2), (4) Date: Sep. 5, 2001
(87) PCT Pub. No.: WO00/53391
PCT Pub. Date: Sep. 14, 2000

(30) Foreign Application Priority Data

Mar. 5, 1999 (AT) .................................. 377/99

(51) Int. Cl.[7] .............................. B01D 19/00
(52) U.S. Cl. .......................... 96/194; 95/266; 425/72.1; 425/73
(58) Field of Search ............... 95/266; 96/193, 96/194; 425/203, 72.1, 73, 74; 264/102

(56) References Cited

U.S. PATENT DOCUMENTS

| | | | | |
|---|---|---|---|---|
| 2,146,532 A | * | 2/1939 | Crane et al. | |
| 2,420,356 A | * | 5/1947 | Compa | |
| 2,540,390 A | * | 2/1951 | Gorgerat et al. | |
| 2,553,359 A | * | 5/1951 | Cook et al. | |
| 2,797,767 A | * | 7/1957 | Brooke et al. | |
| 3,113,843 A | * | 12/1963 | Li | |
| 3,196,597 A | * | 7/1965 | Piper | |
| 3,361,537 A | * | 1/1968 | Ferrante | |
| 3,368,330 A | * | 2/1968 | Elliott et al. | |
| 3,469,369 A | * | 9/1969 | Helmke | |
| 3,778,974 A | * | 12/1973 | Iwasyk | |
| 3,926,664 A | * | 12/1975 | Verreydt | |
| 3,993,462 A | * | 11/1976 | Jones | |
| 4,134,736 A | * | 1/1979 | Hammond, Jr. | |
| 4,711,647 A | * | 12/1987 | Gathmann | |
| 5,584,416 A | * | 12/1996 | Florian | |
| 6,117,212 A | * | 9/2000 | Bucchele et al. | |
| 6,302,933 B1 | * | 10/2001 | Krause et al. | |
| 6,482,254 B1 | * | 11/2002 | Bono et al. | |

* cited by examiner

Primary Examiner—Duane S. Smith
(74) Attorney, Agent, or Firm—Townsend and Townsend and Crew, LLP

(57) ABSTRACT

A device for degassing melts, especially plastic melts, which has a melt nozzle (1) with an inlet connection (11) for connecting to a melt supply, a melt outlet opening and a vacuum chamber (20) defined by essentially vacuum-tight walls, which communicates with a vacuum source and which opens into a discharge opening for an essentially vacuum-tight connection to a melt processing system, the melt outlet opening of the nozzle extending into the degassing chamber. The melt outlet opening (13a) of the nozzle (1) is configured as a slit of a length which is a multiple of its width and which has a curved or folded configuration.

16 Claims, 1 Drawing Sheet

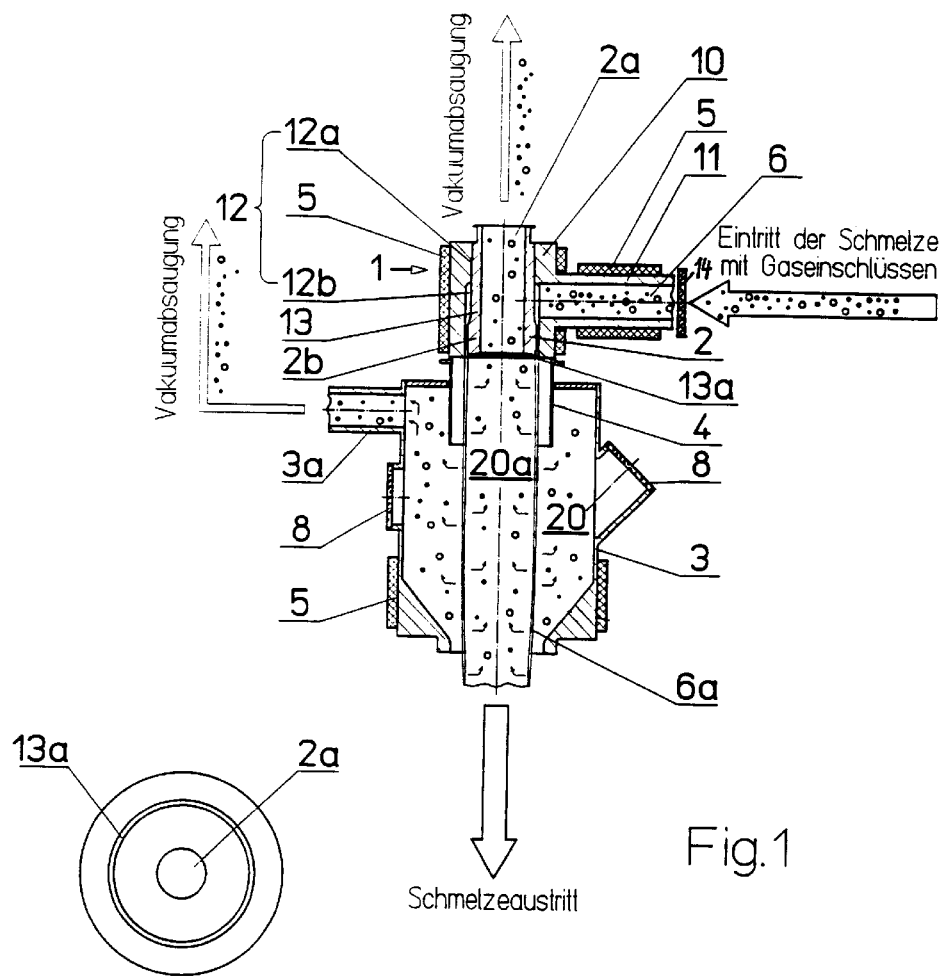
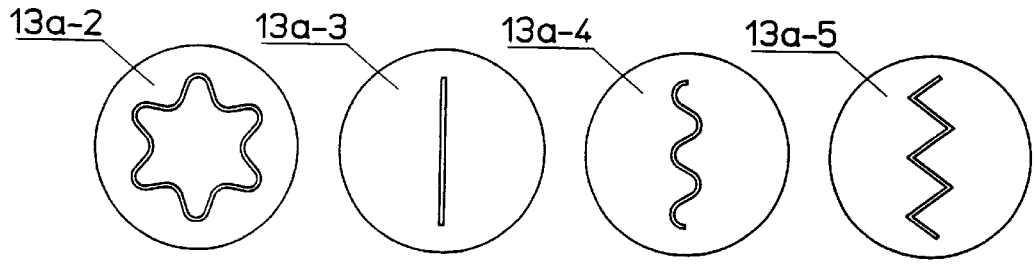

DEVICE FOR DEGASSING MELTS

BACKGROUND OF THE INVENTION

The present invention relates to a device for degassing melts, in particular plastic melts, comprising a melt nozzle which has an inlet connection for connecting to a melt supply and a melt outlet opening, as well as a degassing chamber defined by essentially gas-impermeable walls, communicating with a vacuum source and opening into a discharge opening for essentially tight connection to a melt processing system, the melt outlet opening of the nozzle extending into the degassing chamber.

Such a device for degassing plastic melts is known from an extruder system. In this, granular plastic is molten under heat and pressure in an extruder, and this melt is discharged from the extruder. However, the melt is not homogenous, but contains air bubbles, which make further processing of the melt difficult. For this reason the melt has to be degassed, i.e. freed from air and other gas bubbles. This can be achieved most easily by connecting a vacuum portion to the extruder discharge opening, through which vacuum portion the melt flows. Because of the negative pressure in the vacuum portion, gas bubbles are drawn out of the melt and let off. Because of the high viscosity of the melt this process only works quite inadequately and furthermore necessitates a high vacuum so as to make it possible to draw gas bubbles even out of the central region of the melt. High-vacuum apparatus are very expensive and sensitive, however, and need frequent maintenance. Besides, the gases drawn out are hot (typically 250° C. to 260° C.), and they often contain aggressive vaporized plastic additives that attack the apparatus so that it may be necessary to replace it several times a year.

Thus, in order to be able to reduce the necessity to employ high vacuum, a device of the above type, as taught in U.S. Pat. No. 3,410,938 or the corresponding CH Patent No. 425 207 A, has been developed, wherein the melt flow initially flows through a nozzle connected to the extruder outlet, which nozzle is provided with a nozzle plate having a plurality of through-holes or slits dividing the melt flow into a plurality of "spaghetti-like" or ribbon-like sub-streams. A degassing chamber is connected downstream of the nozzle plate, which is under vacuum and through which the melt sub-streams flow after leaving the nozzle. As the diameter of the melt sub-streams is smaller than that of the flow as a whole it is not necessary to employ a vacuum as high as that employed for directly degassing the melt flow as a whole. However, practical use of this device also has disadvantages, as research carried out by the inventors of the subject matter of the present application has resulted in the discovery that the melt sub-streams have a strong tendency of adhering to each other after leaving the nozzle plate, thus again combining to form a thicker stream, so that the vacuum employed will not be enough to draw the gas bubbles out of the interior of the melt.

SUMMARY OF THE INVENTION

The present invention is based on this discovery and offers a solution for degassing melts in a satisfying way that avoids the disadvantages of the state of the art, while at the same time making it possible to further reduce the vacuum required. The invention emanates from the approach that dividing the melt into sub-streams cannot bring about the desired result as the subsequent reunification of the sub-streams can only be prevented at unduly great efforts. Thus the invention continues to employ an undivided melt flow, which is, however, brought in a shape having a cross-section of very small thickness, by forming the melt outlet opening of the nozzle as a single slit whose length is a multiple of its width and which has a curved or folded configuration in order to accommodate the required length of the slit in the nozzle plate. This measure according to the invention makes it possible to degas the melt to a satisfying degree already at very slight vacuum, for the gas bubbles only have to be drawn to the surface of the melt from a very small depth thereof or even burst by themselves because of the small thickness of the melt flow.

Conveniently the slit has a length that is at least 50 times, preferably at least 500 times, larger than its width. In some applications it may even be considered appropriate to increase the ratio between length and width to 5000:1 and above.

In order to further reduce the amount of vacuum necessary it may be provided for the width of the slit to be less than 2 mm, preferably less than 0.1 mm.

In order not to limit the throughput of melt from the melt supply, e.g. from an extruder, to the subsequent processing means by the interposed degassing device, the cross-sectional area of the slit may not be smaller than a predetermined value. As the width of the slit may not be increased without negatively affecting the degassing performance of the device according to the invention, it is thus necessary to adjust the length of the slit to a suitable value. In order to do so without at the same time unduly increasing the total size of the nozzle, an embodiment of the invention is characterized in that the slit is formed in zigzag or corrugated form in its longitudinal direction.

A particularly favorable embodiment of the device according to the invention is obtained by forming the slit as a ring, as in this case the nozzle may be produced by turning it on a lathe and its total dimensions may be kept small. If it is necessary to further increase the length of the slit, it is of course also possible to form the annular slit in corrugated or zigzag configuration.

In order to avoid the disadvantage that a vacuum is only applied to the exterior surface of the melt hose thus produced while it flows through the degassing chamber, a particularly preferred embodiment of the invention is characterized in that the nozzle has a through-hole extending into the interior of the ring and communicating with a vacuum source. By this measure a vacuum is applied to the melt hose both from the outside and the inside at the same time, which because of the small wall thickness of the melt hose ensures high efficiency of the degassing device according to the invention. The construction of the device is simplified if the through-hole of the nozzle opening into the interior of the ring of the slit communicates with the same vacuum source as the degassing chamber.

In order to be able to vary the thickness of the melt leaving the slit in accordance with the intended use and material properties of the melt, the invention furthermore provides for the nozzle to be equipped with replaceable inserts for slits of different shapes and/or dimensions.

Providing the nozzle and/or the degassing chamber with heating means makes it easier for the melt to flow through the degassing device.

In order to monitor the degassing process, at least one viewing window may be provided in the walls defining the degassing chamber.

Preferably a filter for filtering foreign matters out of the melt flow is provided at the inlet connection of the nozzle.

Thus is it possible to prevent foreign matters from entering the degassing device, which would be in particular harmful if they were inflammable at the temperatures in the degassing device, as undesirable combustion gases would be formed during their combustion.

According to a particularly advantageous embodiment the device according to the invention comprises a Venturi fluid entrainment pump as its vacuum source. Such a pump does not comprise any movable parts but produces a negative pressure in a Venturi tube by a fluid flowing therethrough, which negative pressure sucks fluid from a side entrance into the tube, i.e. in the present case the gases to be withdrawn from the degassing chamber. The Venturi tube may be provided easily with a corrosion-resistant coating on the inside, so that it withstands the aggressive components of the gas to be withdrawn.

The invention will now be described in detail by way of a non-limiting example with reference to the attached drawings.

BRIEF DESCRIPTION OF THE DRAWINGS

FIG. 1 is a longitudinal section of an embodiment of the device according to the invention for degassing melt; and FIGS. 2 to 6 show various embodiments of the slit of the nozzle in a schematic plan view.

DESCRIPTION OF THE PREFERRED EMBODIMENTS

The embodiment of the device according to the present invention for degassing melts shown in longitudinal section in FIG. 1 is formed as a degassing head which is connected downstream of a plastic extruder in order to free the plastic melt produced by the extruder from gas bubbles. The device has a nozzle generally indicated at 1 as well as a degassing chamber generally indicated at 20 downstream thereof. The nozzle 1 has a body 10 generally taking the form of a hollow cylinder, into which a hollow sleeve 11 opens radially, which sleeve may be connected to the discharge opening of a plastic extruder or the like not shown. The nozzle body 10 as well as the sleeve 11 is surrounded by heating elements 5 on the outside. Furthermore a filter 14 is provided at the sleeve so as to remove foreign matters included in the melt stream, in particular inflammable foreign matters like paper, thus effectively preventing the foreign matters from igniting in the degassing device or blocking the nozzle channels. The nozzle body is provided with an axial through bore 12, which has a first upstream portion 12a and a second portion 12b downstream thereof having a radius increased with respect to that of the first portion 12a. A nozzle insert 2 taking the form of a hollow cylinder is inserted into the through bore 12 from the downstream end of the through bore 12, a through bore of the nozzle insert 2 being designated by reference numeral 2a. The outer radius of the jacket of nozzle insert 2 corresponds to the radius of portion 12a of the through bore 12 of nozzle body 10, so that the nozzle insert may fit snugly in the portion 12a in the nozzle body. However, an annular gap 13 is formed between the wall of the enlarged portion 12b of the through bore 12 of the nozzle body 10 and the outer periphery of the jacket of nozzle insert 2, as the radius of the jacket of the nozzle insert is initially constant and only increases close to its downstream end (shown at 2b) so as to reduce the annular gap 13 to the width desired for the melt outlet opening 13a. Sleeve 11 opens into this annular gap 13. Melt 6 entering into nozzle 2 through sleeve 11 is distributed in annular gap 13 and leaves it as a melt hose 6a of very small thickness at its downstream end, i.e. at melt outlet opening 13a. It is to be noted that the nozzle insert 2 may be replaced by inserts of different dimensions so as to adjust the size of the annular gap and of the melt outlet opening, respectively.

A degassing pipe 3 is vacuum-tightly connected to the outlet of nozzle 2 via a connection pipe 4, and its interior defines a degassing chamber 20 communicating with a vacuum source not shown via a connection 3a of the degassing pipe 3. It is to be noted that the term vacuum as used herein includes any suitable negative pressure. The melt hose 6a with gas bubbles therein leaving the nozzle 2 thus flows into the degassing chamber 20, where gas bubbles are withdrawn from the interior of the melt to the surface and then through connection 3a to the outside by the negative pressure, as shown by the bubbles and small arrows in the degassing chamber and by the large arrow with bubbles next to it near connection 3a, respectively. However, as the melt flowing therethrough has the configuration of a continuous hose, the interior space 20a of the melt hose 6a is sealed with respect to the degassing chamber 20. It is, however, desirable for the interior space 20a to be subject to the same negative pressure as the degassing space 20 in order to also carry out degassing of the melt starting from the interior 20a and prevent inflation of the melt hose by a difference in pressure between its inside and its outside. For this reason nozzle insert 2 was provided with through bore 2a, which is connected to a vacuum source not shown. Conveniently the vacuum source is the same as the one connected to the connection 3a of the degassing pipe 3, which is how differences in pressure between the inside and the outside of the melt hose are prevented. As the vacuum source need not produce a particularly high vacuum for degassing because of the small wall thickness of the melt hose, it is possible to employ a side fan or a Venturi fluid entrainment pump. The use of a Venturi fluid entrainment pump (also known as Venturi system or jet ejector pump) is preferred, as it contains no movable parts and may easily be coated so as to become corrosion-resistant, which is how it becomes preferable to other types of vacuum pumps because of its much longer service life.

The progress of degassing of the melt hose 6a may be monitored through viewing window 8 in degassing pipe 3. Degassing pipe 3 is surrounded by heating means 5 as well. While melt hose 6a is flowing through the degassing chamber, gas bubbles are continuously withdrawn from the melt and discharged, so that the melt hose will have been degassed to a sufficient extent when it reaches the downstream end of the degassing chamber and thus may be subjected to further processing. For instance a discharge extruder may be connected in vacuum-tight fashion to the degassing pipe. In any event, however, the degassing pipe is sealed vacuum-tightly by a subsequent processing station.

Apart from the embodiment of the nozzle having a ring-shaped melt outlet opening 13a, as described in detail and schematically shown in FIG. 2 in plan view from the downstream nozzle end, it is also possible to use different configurations of melt outlet openings. Examples thereof are shown in schematic plan view in FIGS. 3 to 6, which in this order show a corrugated annular melt outlet opening 13a–2, a straight melt outlet opening 13a–3, which is not within the scope of the present invention, a generally straight but corrugated melt outlet opening 13a–4 and a zigzag melt outlet opening 13a–5. These melt outlet openings may be also formed by providing replaceable nozzle inserts of corresponding shapes, the embodiments of FIGS. 4 to 6 making it necessary to use suitable designs, known to specialists in the field of extrusion, to ensure that the melt will be distributed all over the width of the melt outlet opening inside the nozzle.

What is claimed is:

1. Apparatus for degassing a relatively viscous, melted plastic material comprising a thin orifice slit having a length that is many times greater than its width, an inflow conduit for connection to an extruder in flow communication with the orifice slit for supplying the viscous, melted plastic material under pressure to the orifice slit and extruding the viscous plastic material through the orifice slit into a viscous extruded plastic sheet, a vacuum chamber coupled to the orifice slit and receiving the extruded sheet, and a vacuum source fluidly connected to the vacuum chamber for applying a vacuum to the vacuum chamber and subjecting both sides of the extruded sheet to the vacuum so that gas inclusions in the extruded plastic sheet propagate to the sides of the sheet and escape from the sheet into the vacuum chamber.

2. A device according to claim 1 wherein the orifice slit has one of a zigzag and a corrugated configuration in its longitudinal direction.

3. A device according to claim 1 wherein the orifice slit has a ring-shaped configuration arranged about an orifice center, and wherein the orifice center has a through-hole subjected to a vacuum.

4. A device according to claim 3 wherein the through-hole in the orifice center communicates with the same vacuum source as the vacuum chamber.

5. A device according to claim 1 wherein the slit has a length which is at least 50 times as large as its width.

6. A device according to claim 1 wherein the orifice slit has a length which is at least 500 times as large as its width.

7. A device according to claim 1 wherein the width of the slit is less than 2 mm.

8. A device according to claim 1 wherein the width of the orifice slit is less than 0.1 mm.

9. A device according to claim 1 wherein the orifice slit is defined by a nozzle.

10. A device according to claim 9 wherein the nozzle includes a nozzle insert defining the orifice slit, and including a plurality of replaceable inserts each having an orifice slit which has a configuration and/or dimension that is different from the configuration and/or dimension of the orifice slits in the other inserts.

11. A device according to claim 1 including a heater for heating at least one of the nozzle and the vacuum chamber.

12. A device according to claim 1 wherein the vacuum chamber includes at least one viewing window.

13. A device according to claim 1 including a filter for filtering foreign matters from the melted plastic material upstream from the orifice slit.

14. A device according to claim 1 wherein the vacuum source comprises a Venturi fluid entrainment pump.

15. Apparatus for degassing a relatively viscous plastic material comprising an annular extrusion orifice for the viscous plastic material, an inflow conduit for connection to an extruder in fluid communication with the extrusion orifice for supplying pressurized viscous plastic material to the extrusion orifice and extruding a hose of the viscous plastic material through the extrusion orifice, the hose having a radially inner side and a radially outer side, an upstream portion proximate the orifice nozzle and a downstream portion remote from the orifice nozzle, one of the inner and outer sides of the hose being sealed with respect to the vacuum chamber at the upstream and downstream portions of the hose for maintaining the vacuum in the chamber, a first vacuum source for applying vacuum to the vacuum chamber acting along the outer side of the hose, and a second vacuum source for applying a vacuum acting on the inner side of the hose.

16. A device for degassing plastic melts comprising a melt nozzle which has an inlet connection for connecting to a melt supply and a melt outlet opening, a degassing chamber defined by substantially gas-impermeable walls which communicates with a vacuum source and which opens into a discharge opening for a sealed connection to a melt processing system, the melt outlet opening of the nozzle extending into the degassing chamber, the melt outlet opening of the nozzle being configured as a slit of a length which is a multiple of its width, the slit communicating over its entire periphery with the vacuum source.

* * * * *